(12) United States Patent
Potter et al.

(10) Patent No.: US 7,395,906 B2
(45) Date of Patent: Jul. 8, 2008

(54) BRAKE ACTUATOR

(75) Inventors: Laurence John Potter, Mosely (GB); Robert David Prescott, Solihull (GB)

(73) Assignee: Haldex Brake Products Ltd. (GB)

( * ) Notice: Subject to any disclaimer, the term of this patent is extended or adjusted under 35 U.S.C. 154(b) by 0 days.

(21) Appl. No.: 11/620,977

(22) Filed: Jan. 8, 2007

(65) Prior Publication Data
US 2007/0158146 A1    Jul. 12, 2007

Related U.S. Application Data (63) Continuation of application No. PCT/GB2005/002526, filed on Jun. 29, 2005.

(30) Foreign Application Priority Data

Jul. 8, 2004    (GB) ................... 0415324.3

(51) Int. Cl.
*B60T 17/08* (2006.01)

(52) U.S. Cl. ............... 188/170; 303/71; 92/62; 92/98 R; 92/130 A (58) Field of Classification Search ... 188/79.55–79.57, 188/153 D, 170; 91/440, 1, 5; 303/71; 92/62, 92/63, 82, 98 R, 130 A
See application file for complete search history.

(56) References Cited

U.S. PATENT DOCUMENTS

| 3,302,530 A | 2/1967 | Dobrikin et al. ............ 91/440 |
| 3,736,842 A | 6/1973 | Valentine ....................... 91/1 |
| 6,907,818 B2 * | 6/2005 | Anderson ...................... 92/62 |

FOREIGN PATENT DOCUMENTS

| DE | 10228934 | 1/2004 |
| EP | 0 279 930 | 8/1988 |
| GB | 1 162 458 | 8/1968 |
| WO | 99/38744 | 8/1999 |
| WO | 03/080417 | 10/2003 |

OTHER PUBLICATIONS

International Search Report; Sep. 12, 2005; 4 pages.
United Kingdom Search Report; Nov. 16, 2004; 1 page.
Written Opinion of the International Searching Authority; 5 pages.

* cited by examiner

*Primary Examiner*—Christopher P Schwartz
(74) *Attorney, Agent, or Firm*—St. Onge Steward Johnston & Reens LLC (57) ABSTRACT

A brake actuator including a chamber in which is provided a movable pressure responsive element which divides the chamber into first and second compartments, the brake actuator also including a valve assembly with an inlet which is connected to a source of pressurised fluid, an outlet which is connected to a volume within the brake actuator not including the second compartment, and an exhaust port through which fluid from the volume may be released, wherein the exhaust port of the valve assembly is connected to the second compartment.

11 Claims, 7 Drawing Sheets

BRAKE ACTUATOR

CROSS-REFERENCE TO RELATED APPLICATIONS

The present application is a continuation of pending International patent application PCT/GB2005/002526 filed on Jun. 29, 2005 which designates the United States and claims priority from Great Britain patent application 0415324.3 filed on Jul. 8, 2004, the content of which is incorporated herein by reference.

FIELD OF THE INVENTION

This invention relates to a brake actuator, particularly, but not exclusively to a brake actuator for a large or heavy vehicle such as a bus, coach or heavy goods vehicle.

BACKGROUND OF THE INVENTION

For large or heavy vehicles, it is known to provide brake actuators with two brake mechanisms, namely a service brake for deceleration when the vehicle is in motion, and a parking brake to hold the vehicle stationery.

Conventionally such brake actuators include a first pressure responsive element, such as a diaphragm or piston, and this is connected to a rod which is extended to apply a braking force and retracted to release the braking force. The pressure responsive element is mounted in a chamber within the brake actuator and divides the chamber into two compartments, a first of which is closed, and thus may be pressurised, and a second of which is open to the atmosphere. The pressure responsive element is biased to a position where the rod is withdrawn by means of a return spring provided in the brake and/or a first resilient biasing element such as a helical compression spring which is located in the second compartment, and is moved to a position where the rod is extended by the supply of pneumatic fluid pressure to the first compartment.

Thus, service braking is achieved by the supply of pressurised fluid to the first compartment of the chamber, and this may be controlled by means of an ABS or EBS valve which is connected to a source of pressurised fluid such as compressed air.

To apply the parking brake, there is provided a second piston or other pressure responsive element which is biased into engagement with the first pressure responsive element by means of a second resilient biasing element, typically a helical compression spring.

The second resilient biasing element which is mounted in a second chamber within the brake actuator, and conventionally, the second chamber is open, and vents to the atmosphere. The second biasing element acts on the second pressure responsive element to move the first pressure responsive element against the biasing force of the first biasing element into a position where the rod is extended. Thus a braking force is applied, irrespective of the supply of fluid pressure to the first compartment.

In order to release the parking brake, the second pressure responsive element is moved against the biasing force of the second biasing element, in order to allow the first pressure responsive element to move under the biasing force of the first biasing element to retract the rod. This may be achieved by either mechanical means or by the application of pneumatic fluid pressure to the second pressure responsive element.

In the latter case, the brake actuator is also provided with a quick release valve which, when opened, releases any pressurised fluid acting on the second pressure responsive element to apply the parking brake. Thus, the quick release valve may be opened in order to operate the parking brake. Where the parking brake is adapted to be released by means of pneumatic fluid pressure, for example using compressed air, the quick release valve typically vents the fluid to the atmosphere.

In such conventional brake actuators, both the second compartments are exposed to air from around the brake actuator, which is drawn into the second compartment of the first chamber and the second chamber respectively, whenever the volume of the respective second compartment is allowed to expand. Such air is often damp, and may contain aggressive chemicals such as salt, and therefore may cause corrosion of the interior surfaces of the second compartment and any resilient biasing element contained therein, which ultimately may result in failure of the brake actuator.

SUMMARY OF THE INVENTION

According to a first aspect of the invention we provide a brake actuator including a chamber in which is provided a movable pressure responsive element which divides the chamber into first and second compartments, the brake actuator also including a valve assembly with an inlet which is connected to a source of pressurised fluid, an outlet which is connected to a volume within the brake actuator not including the second compartment, and an exhaust port through which fluid from the volume may be released, wherein the exhaust port of the valve assembly is connected to the second compartment.

Thus, the second compartment may be filled exclusively or primarily with fluid from the source of pressurised fluid, and need not be subjected to damp and/or salty air from around the brake actuator. Thus, corrosion of the interior surfaces may be reduced, and hence the longevity of brake actuator may be increased.

Preferably the outlet of the valve assembly is connected to the first compartment. In this way movement of the pressure responsive element may assist in expelling fluid from the first compartment to the valve assembly, and drawing in the expelled fluid from the exhaust port into the second compartment.

The second compartment may have mounted therein a resilient biasing element which may act on the pressure responsive element to move the pressure responsive element to reduce the volume of one compartment and increase the volume of the other compartment. In this case, by virtue of the invention, corrosion of the resilient biasing element may be reduced, and the risk of fatigue failure of the resilient biasing element correspondingly reduced.

The pressure responsive element may be movable between a braking position and an inoperative position, and the resilient biasing element may urge the pressure responsive element towards the inoperative position, i.e. for service braking.

Alternatively, the resilient biasing element may urge the pressure responsive element towards the braking position, i.e. for parking braking.

The brake actuator may further include an actuator exhaust port which is connected between the exhaust port of the valve assembly and the second compartment, so that the second compartment and the exhaust port of the valve assembly are always in fluid communication with the atmosphere.

The brake actuator may also include a second chamber in which is provided a second movable pressure responsive element which divides the second chamber into first and second compartments, the first compartment being connected to a source of pressurised fluid via a second valve assembly and the second compartment having mounted therein a second resilient biasing element which may act on the second pressure responsive element to move the second pressure responsive element to reduce the volume of one compartment and increase the volume of the other compartment, the second valve assembly including an exhaust port through which pressurised fluid from the first compartment may be released, both pressure responsive elements being movable between a braking position and an inoperative position, and one resilient biasing element urging its respective pressure responsive element towards the inoperative position, and the other resilient biasing element urging its respective pressure responsive element towards the braking position. The brake actuator may thus provide for service and parking braking.

The first or second valve is preferably located between the first chamber and the second chamber, as this may assist in reducing the size of the brake actuator.

The first and second chambers may be contained within a housing and one or both of the first or second valve assembly (ies) may be integral with the housing.

The exhaust port of the second valve assembly may be connected to the second compartment of the second chamber. Additionally or alternatively, the exhaust port of the first valve assembly may be connected to the second compartment of the second chamber.

Where the brake actuator is provided with an actuator exhaust port, the exhaust ports of both the first and second valve assemblies may be connected to the actuator exhaust.

In this case, the second compartment of the second chamber may be in fluid communication with the second compartment of the first chamber. Thus, where the first resilient biasing element urges the first pressure responsive element towards the inoperative position, and the second resilient biasing element urges the second pressure responsive element towards the braking position, when the parking brake is released, i.e. when the second pressure responsive element moves against the biasing force of the second resilient biasing element to reduce the volume of the second compartment of the second chamber, and the first pressure responsive element moves with the biasing force of the first resilient biasing element to increase the volume of the second compartment of the first chamber, the fluid expelled from the second compartment of the second chamber and the fluid expelled from the exhaust of the first valve are drawn into the expanding second compartment of the first chamber, and vice versa when the parking brake is applied.

In this case, the first and second chambers may be contained within a housing, the first valve assembly located between the first chamber and the second chamber, and the second valve assembly is mounted on an exterior surface of the housing. The first and second valve assemblies may be integral with the housing.

BRIEF DESCRIPTION OF THE DRAWINGS

An embodiment of the invention will now be described, by way of example only, with reference to the following drawings of which.

DETAILED DESCRIPTION OF THE INVENTION

Figure 1:
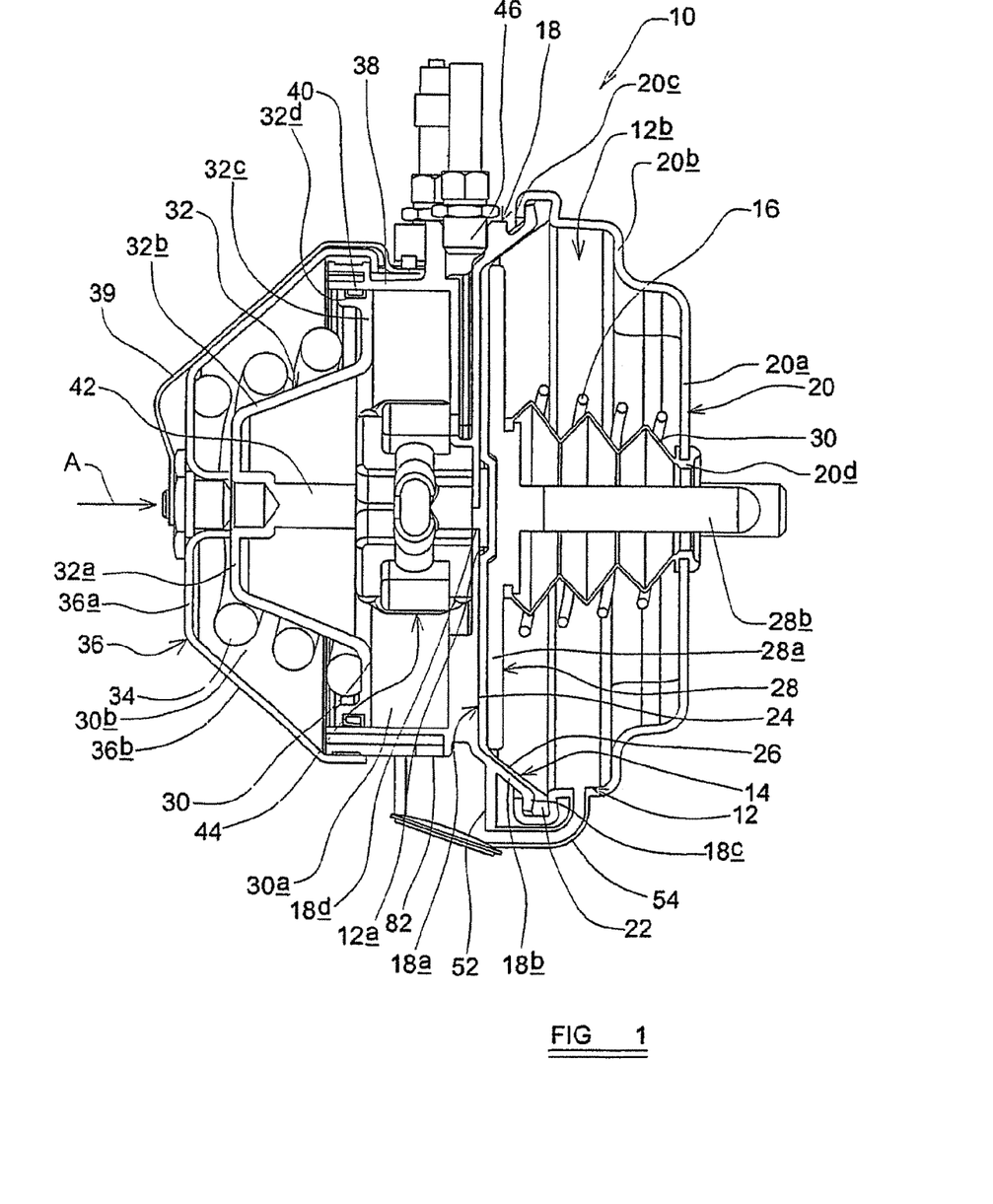
FIG. 1 is an illustration of a step section through a brake actuator according to the first aspect of the invention.
Figure 2:
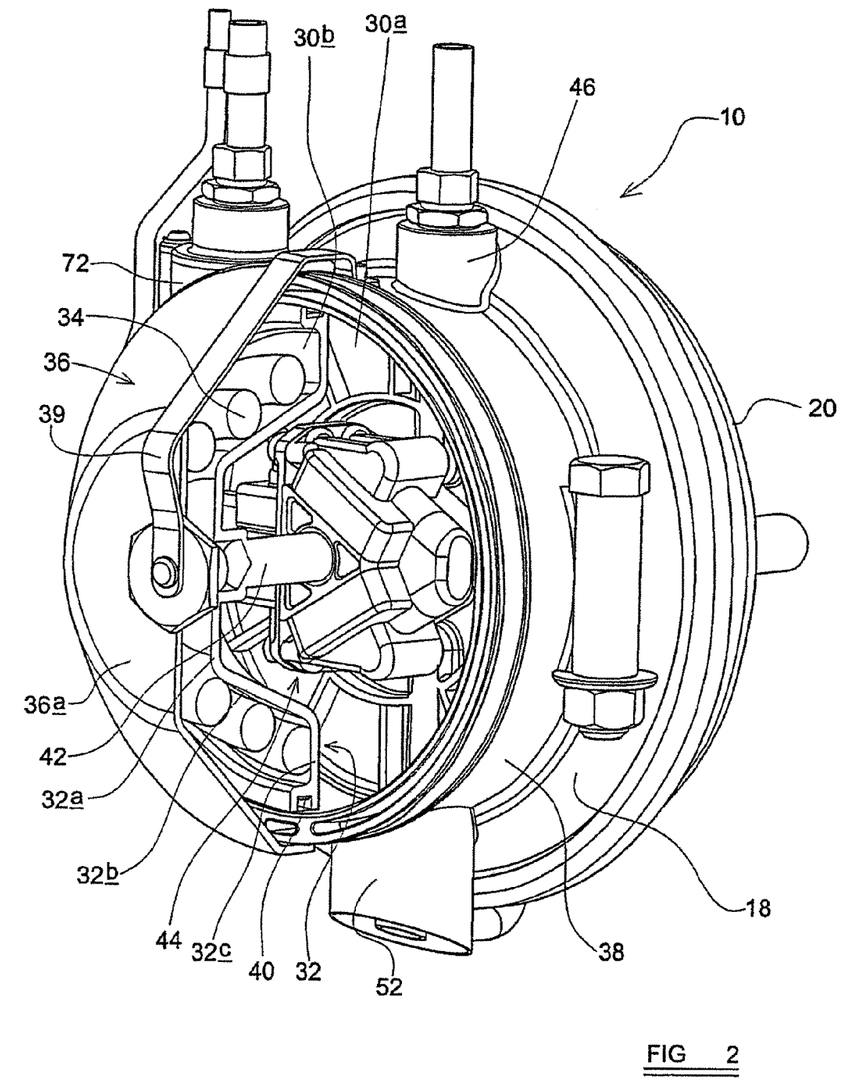
FIG. 2 is a cut away perspective view of the brake actuator of FIG. 1 from the direction of arrow A in FIG. 1.
Figure 3:
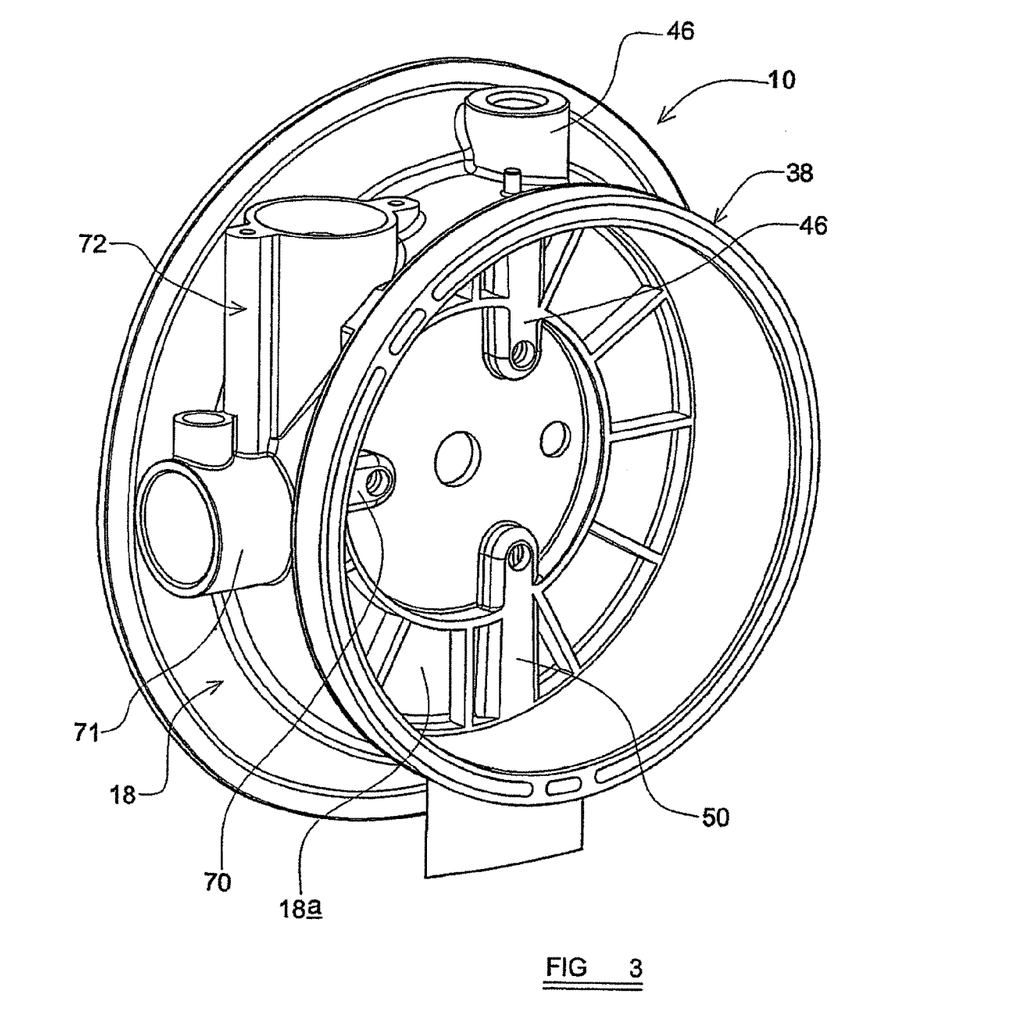
FIG. 3 is a further cut away perspective view of the brake actuator of FIG. 2, from the direction of arrow A in FIG. 1.
Figure 4:
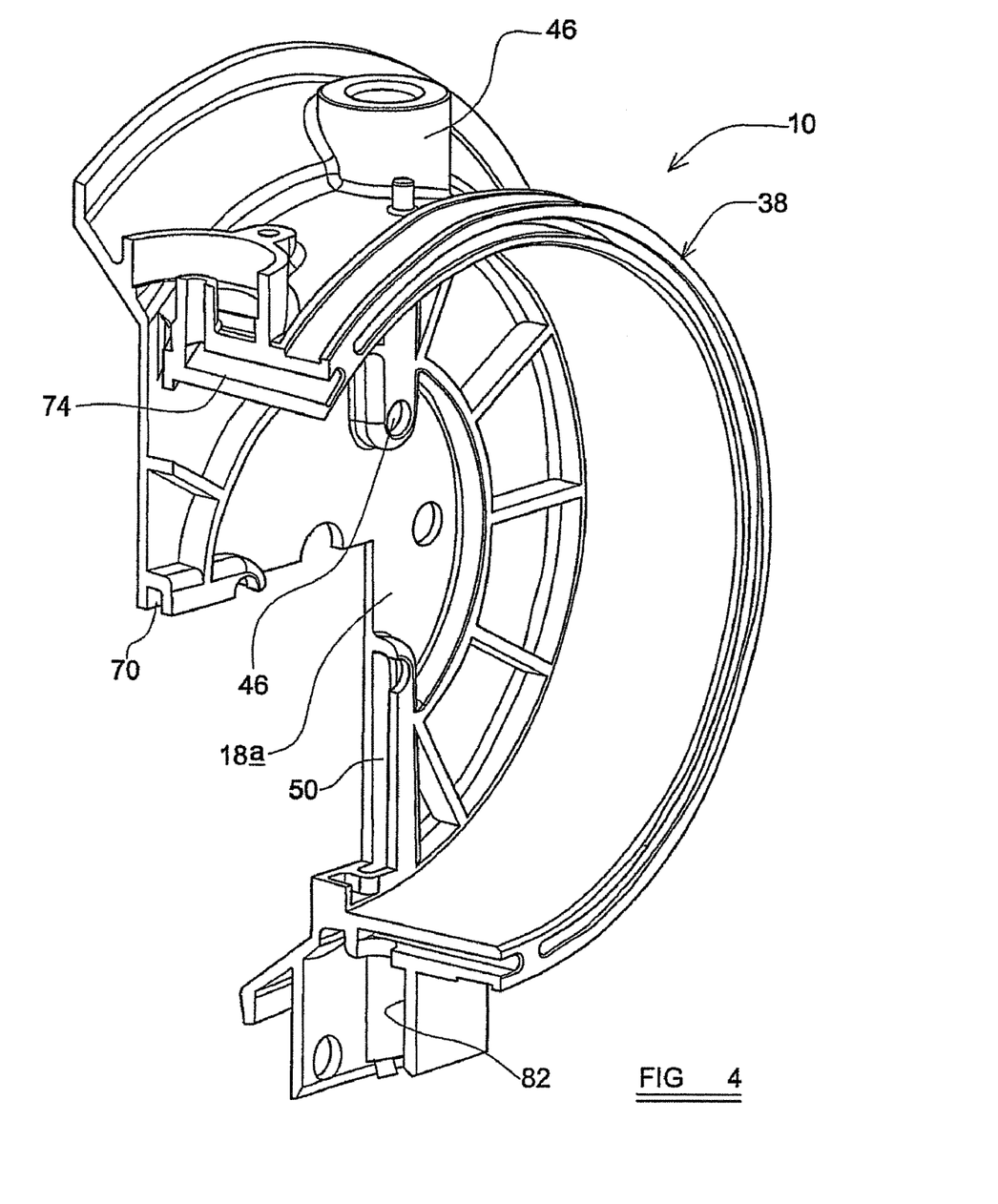
FIG. 4 is cut away perspective view of part of the brake actuator as shown in FIG. 3.
Figure 5:
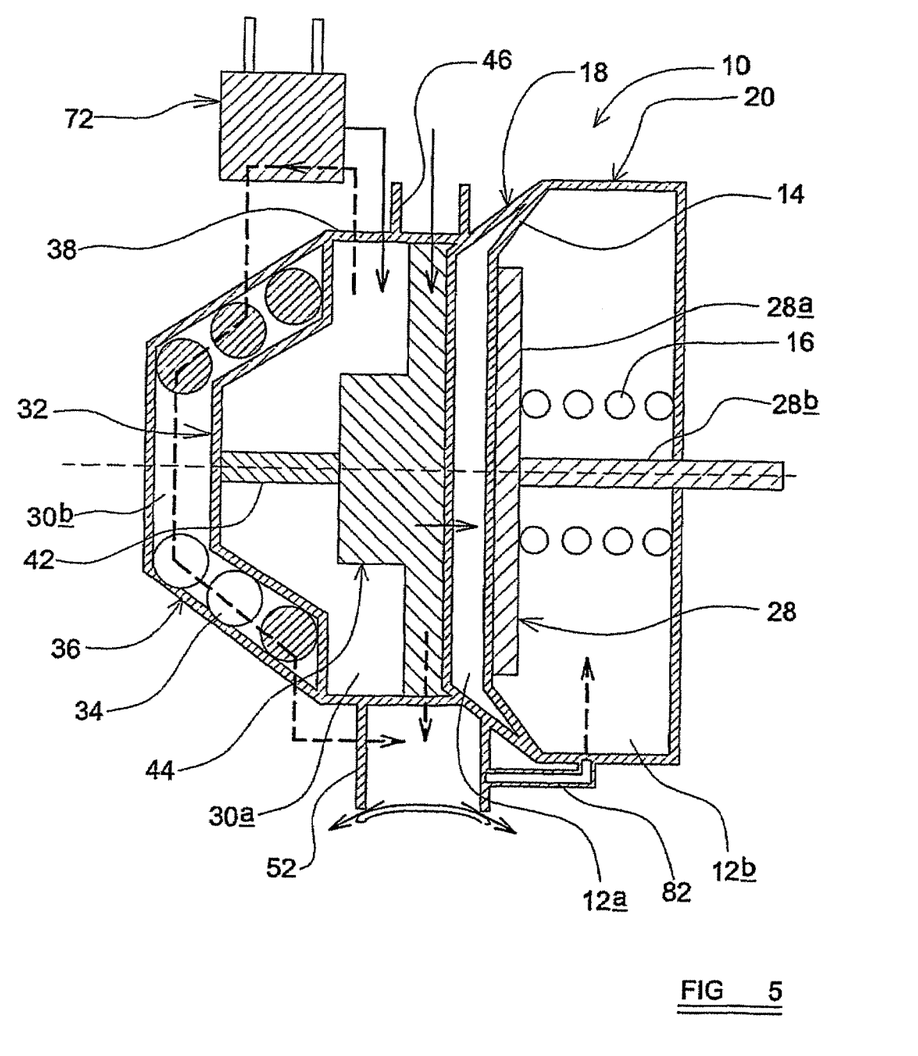
FIG. 5 is a schematic illustration of the brake actuator of FIG. 1.

Referring now to the figures, there is shown a brake actuator 10 including first chamber 12 in which is provided a first pressure responsive element, which in this example is a diaphragm 14. The diaphragm 14 divides the first chamber into a first compartment 12a and a second compartment 12b. A first resilient biasing element 16 is mounted in the second compartment 12b and acts on the diaphragm 14 so as to increase the volume of the second compartment 12b and reduce the volume of the first compartment 12a, i.e. to move the diaphragm 14 towards the left as shown in FIGS. 1 and 5.

In this example, the first chamber 12 is formed by first 18 and second 20 casing parts, the first casing part 18 being generally frusto-conical with a generally circular end plate 18a, a side portion 18b extending from the periphery of the end plate 18a, and a lip formation which extends radially outwardly from the free end of the side portion 18b. The end plate 18a is provided with a generally central aperture 18d, the purpose of which will be explained below.

The second casing part 20 also includes a generally circular end plate 20a and a side portion 20b extending from the periphery of the end plate 20a, and an annular lip formation 20c which extends radially inwardly from the free end of the side portion 20b. In this case, the side portion 20b includes two step formations so that the side portion 20b encloses three generally cylindrical spaces which increase in diameter from the end plate 20a to the lip formation 20c. The end plate 20a also includes a generally central aperture 20d.

The two casing parts 18, 20 are joined by folding the lip formation 20c of the second casing part 20 over the lip formation 18c of the first casing part 18 so that the lip formation 18c of the first casing part 18 is closer to the end plate 20a of the second casing part 20 than the lip formation 20c of the second casing part 20.

The diaphragm 14 has an edge part which is clamped between the lip formation 18c of the first casing part 18 and a step formation of the side portion 20b of the second casing part 20. The diaphragm 14 also has a generally flat central part 24 which is connected to the edge part 22 via a flexible inclined part 26.

In contact with the diaphragm 14 is an actuating member 28 comprising a generally circular rigid disc 28a and an actuating rod 28b which extends generally centrally from the disc 28a through the aperture 20d in the end plate 20a of the second casing part 20. The actuating rod 28b is connected to a vehicle brake (not shown) so that movement of the actuating rod 28b out of the casing, i.e. to the right as shown in FIGS. 1 and 5, activates the vehicle brake. When actuating rod 28b extends from the casing, the diaphragm 14 is thus in an operative, braking, position.

The first resilient biasing element 16 in this example is a generally conical helical compression spring which extends between the disc 28a of the actuating member 28 and the end plate 20a of the second casing part 20 and around the actuating rod 28b. Thus, in this example, the spring 16 acts to bias the disc 28a and hence the diaphragm 14 to the left as shown in FIGS. 1 and 5, and hence to bias the diaphragm 14 and actuating rod 28b to an inoperative position.

A concertina sealing tube 29 extends from the disc 28a of the actuating member 28 to the end plate 20a of the second casing part 20, between the spring 16 and the actuating rod 28b, substantially to prevent fluid from escaping from the second chamber 12b via the apertures 18d, 20d in the two end plates 18a, 20a.

The brake actuator 10 also includes a second chamber 30 in which is provided a second movable pressure responsive element 32, which in the example is a piston. The piston 32 divides the second chamber 30 into first 30a and second 30b compartments, and a second resilient biasing element 34 is located in the second compartment 30b. The second resilient biasing element 34 acts on the piston 32 so as to increase the volume of the second compartment 30b and reduce the volume of the first compartment 30a, i.e. to move the piston 32 to the right as shown in FIGS. 1 and 5.

The second chamber 30 is defined by third 36 and fourth 38 casing parts. The third casing part 36 is generally frusto conical and includes a generally circular end plate 36a and a side portion 36b which extends from the periphery of the end plate 36a. In this example, the fourth casing part 38 encloses a generally cylindrical space and is integral with the first casing part 18, extending from the end plate 18a in the opposite direction to the side portion 18b of the first casing part 18b. The third casing part 36 is secured to the fourth casing part 38 by means of a securing arm 39 which is bolted to the centre of the end plate 36a of the third casing part 36 at a first end, and at a second end is bolted to the fourth casing part 38.

The piston 32 is also generally frusto-conical and has a generally circular end plate 32a, a side wall 32b which extends from the periphery of the end plate 32a towards the end plate 18a of the first casing part 18, and a generally annular sealing lip 32c which extends radially outwardly of a free end of the side wall 32b. The sealing lip 32c includes a groove formation 32d in which is received a sealing element, in this case a rubber O-ring 40, which bears against a radially inwardly facing surface of the fourth casing part 38. Thus, a substantially fluid tight seal is provided between the piston 32 and the fourth casing part 38, whilst movement of the piston 32 within the second chamber 30 is permitted.

The piston 32 further includes a second actuating rod 42, which extends generally centrally from the end plate 32a into and beyond the space enclosed by the side wall 32b.

The second resilient biasing element 34 in this example is a generally conical helical compression spring which extends around the side wall 32b of the piston from the end plate 36a of the third casing part 36 to the sealing lip 32c of the piston 32. The spring 34 thus urges the piston 32 towards the end plate 18a of the first casing part 18.

An ABS valve assembly 44 is mounted on the end plate 18a of the first casing part 18 in the second chamber 30, generally centrally of the end plate 18a. An aperture extends through the centre of the ABS valve assembly 44, and when the piston 32 is moved under the action of the second spring 34 towards the right as shown in FIGS. 1 and 5, the second actuating rod 42 passes through the apertures in the ABS valve assembly 44 and the end plate 18a of the first casing part 18 to engage with the diaphragm 14 and move the diaphragm 14 to its operative position.

The ABS valve assembly 44 is connected to a supply of pressurised fluid, in this example compressed air, by means of a first inlet conduit 46. The ABS valve assembly 44 also includes an outlet conduit 48 which directs pressurised fluid from the ABS valve assembly 44 through the aperture 18d in the end plate 18a into the first compartment 12a of the first chamber 12. Thus, the ABS valve assembly may be operated to provide service braking, i.e. to move the diaphragm 14 and cause the vehicle brake to be activated in response to demand by a driver of the vehicle.

The ABS valve assembly 44 also includes an exhaust conduit 50 which extends radially outwardly from the ABS valve assembly through the end plate 18a to a generally cylindrical actuator exhaust 52 which, in this example, is integral with the first 12 and fourth 38 casing parts. A further conduit 54 extends from the actuator exhaust 50 to the second compartment 12b of the first chamber 12. The actuator exhaust 52 is also provided with a plurality of apertures so that, if excess fluid pressure builds up in the actuator exhaust, fluid may be vented from the exhaust 52 to the atmosphere.

Figure 6A:
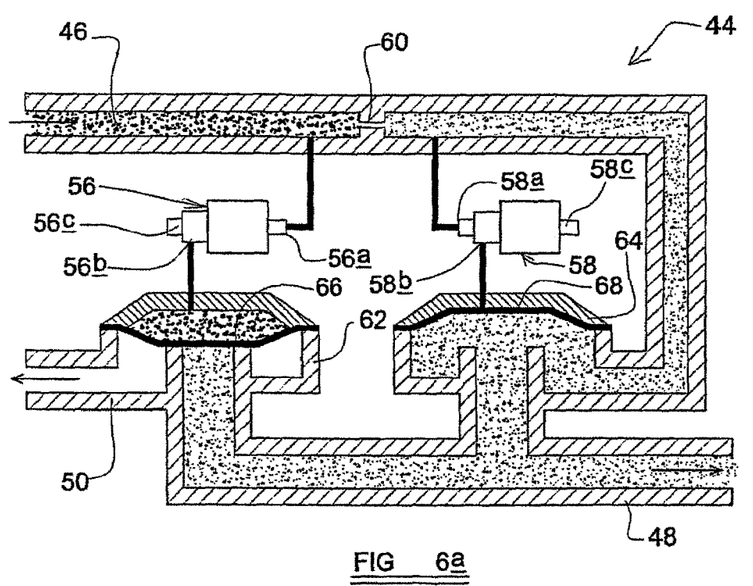
FIG. 6 is a schematic illustration of the ABS valve assembly of the brake actuator of FIG. 1.
Figure 6B:
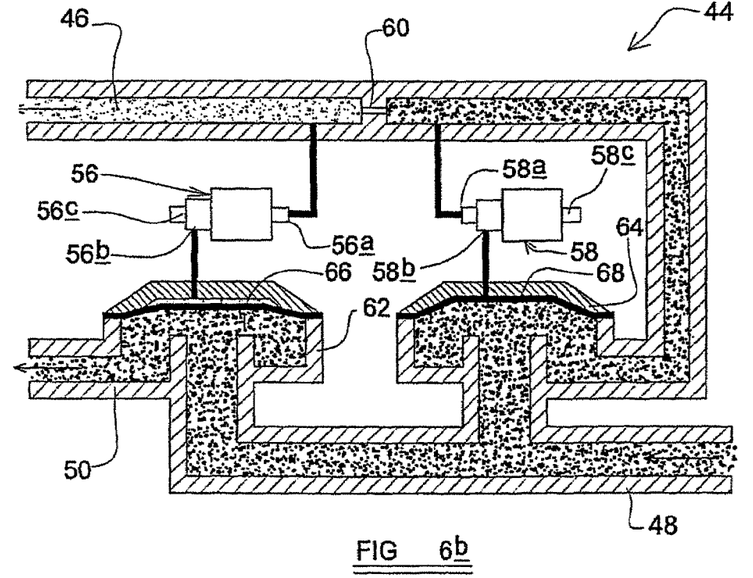

The ABS valve assembly 44 is represented schematically in FIGS. 6 and 6b and includes first 56 and second 58 three way valves, which in this example are solenoid operated. Electrical connections to the solenoids extend along an electrical connection conduit 70 which extends radially outwardly from the ABS valve assembly 44, through the end plate 18a to a generally cylindrical electrical connection port 71 which is integral with the first 12 and fourth 38 casing parts.

Each valve 56, 58 has an inlet port 56a, 58a, and outlet port 56b, 58b, and an exhaust port 56c, 58c which is vented to atmosphere. The inlet ports 56a, 58a of both the valves 56, 58 are connected to the inlet conduit 46 of the ABS valve assembly, the inlet port 56a of the first valve 56 being connected to the inlet conduit 46 upstream of a restriction 60 provided in the inlet conduit 46 and the inlet port 58a of the second valve 58 being connected downstream of said restriction 60. The outlet ports 56b, 58b of the valves 56, 58 are connected to first and second chambers 62, 64 respectively, the inlet conduit 46 of the ABS valve assembly 44 being connected to the second chamber 68, and the exhaust conduit 50 being connected to the first chamber 66. The output conduit 48 of the ABS valve assembly is connected to both chambers 62, 64. The chambers are each provided with a diaphragm 66, 68 which separates the valve outlet ports 56b, 58b from the outlet conduit 48.

The ABS valve assembly activated when wheel lock is detected in order to reduce the risk of the vehicle skidding, as in conventional ABS systems. At other times, the ABS valve assembly is in a passive state, as illustrated in FIG. 6, and facilitates service braking in response to demand from the driver of the vehicle. When in its passive state, the first valve 56 is open such that fluid may pass from the inlet port 56a to the outlet port 56b, and the second valve 58 is closed so that the fluid cannot pass between the inlet port 58a, outlet port 58b or the exhaust port 58c. The valves 56, 58 are typically solenoid operated, but the solenoids are only energised to change the state of the valves 56, 58 when activation of the ABS system is required.

If service braking, i.e. braking when the vehicle is in motion to decelerate the vehicle, is required, high pressure fluid is supplied to the ABS valve assembly 44 via the inlet conduit 46, and, as the first valve 56 open, high pressure fluid flows between the inlet port 56a and the outlet port 56b and into the first chamber 62. The second valve 58 is closed, so fluid flow between the inlet port 58a and the outlet port 58b is not permitted, and the pressurised fluid continues along the inlet conduit 46 and into both the first and second chambers 62, 64.

Due to the restriction 60 in the inlet conduit 46, the pressure of the fluid downstream of the restriction 60, and hence the pressure of the fluid flowing into the chambers 62, 64 from the inlet conduit 46, is lower than the pressure of the fluid flowing through the first valve 56. The higher pressure fluid from the first valve 56 overcomes the pressure exerted by the lower pressure fluid from the inlet conduit 46 on the first diaphragm 66 and moves the diaphragm 66 to a position where it engages with a seat provided by the inlet conduit 46 within the first chamber 62. The diaphragm 66 thus substantially prevents flow of the lower pressure fluid into the first chamber 62, and no fluid may escape through the ABS exhaust conduit 50. The pressure of the fluid within the second chamber 64 moves the second diaphragm such that flow of fluid from the inlet conduit 46, through the second chamber 64 and out into the outlet conduit 48 is permitted. This is illustrated in FIG. 6a, in which the heavier shading represents higher pressure fluid, and the lighter shading represents lower pressure fluid.

Thus, pressurised fluid is supplied to the first compartment 12a of the first chamber 12. This causes the diaphragm 14 to move to its braking position, i.e. to the right as shown in FIGS. 1 and 5, with the actuating rod 28b extending from the casing to activate the brake.

In order to remove the braking force, the supply of pressurised fluid to the inlet conduit 46 is removed. As a result, fluid flow through the inlet conduit 46 is reversed, and fluid pressure from the outlet conduit 48 moves the second diaphragm 68 such that flow of fluid from the outlet conduit 48 to the inlet conduit 46 is permitted.

In this instance, the restriction 60 ensures that the pressure of fluid passing through the first valve 56 from the inlet conduit 46 and into the first chamber 62 is lower than the pressure of the fluid in the outlet conduit 48. Thus, the first diaphragm moves out of engagement with the seat in the first chamber 62 and pressurised fluid may thus flow from the outlet conduit 48 to the exhaust conduit 50. This is illustrated in FIG. 6b, in which the heavier shading represents higher pressure fluid, and the lighter shading represents lower pressure fluid.

As a result, fluid pressure in the first compartment 12a of the first chamber 12 is reduced, and the biasing forces of a return spring in the vehicle brake and the first resilient biasing element 16 moves the diaphragm back to its inoperative position - to the left as shown in FIGS. 1 and 5, in which the actuating rod 28a is retracted.

In a conventional braking system, fluid used to apply service braking is vented at a foot pedal operated by the driver to apply the brake, and hence the fluid must travel from the brake actuator 10 and through the entire fluid distribution system before it can escape. This may result in a slight delay between the driver acting to remove the brake, and the removal of the braking force. It should be appreciated that in the present system, the fluid used to apply service braking is vented at the actuator itself, (i.e. locally) rather than at the foot pedal, and therefore this delay may be reduced.

Moreover in a conventional brake actuator, the second compartment 12b of the first chamber 12 would vent to the atmosphere, thus movement of the diaphragm 14 back to its inoperative position would cause ambient air to be drawn into the second compartment 12b. Such air is often damp, however, and may include corrosive agents such as salt. As a result of prolonged exposure to such an atmosphere, the spring 16, and the interior surfaces of the second compartment 12b may become corroded. Corrosion of the interior surfaces is particularly damaging as it causes the surfaces to become rough and pitted, which increases abrasion and wear of moving parts such as the diaphragm 14.

In this brake actuator 10, however, the second compartment 12b is not vented to the atmosphere, but is connected to the exhaust conduit 50 of the ABS valve assembly 44. Thus, as vehicle brake is released, and the diaphragm 14 moves under the action of the spring 16 towards its inoperative position, high pressure fluid is expelled from the first compartment 12a through the ABS valve assembly 44, along the exhaust conduit 50 and is drawn along the additional conduit 54 and into the second compartment 12b of the first chamber 12 as the volume of the second compartment 12b increases. Thus, the spring 16 is exposed primarily to clean, dry exhaust air from the ABS valve assembly 44, and not to damp, salty air from the atmosphere around the brake actuator 10, and corrosion 16 of the second compartment 12b and the spring 16 may be correspondingly reduced.

In order to operate the parking brake, i.e. braking to hold the vehicle stationary, the first compartment 30a of the second chamber 30 is connected to a source of pressurised fluid, which may be the same source of compressed air as used to facilitate service braking, by means of a quick release valve assembly 72. The quick release valve assembly 72 is mounted on an exterior surface of the brake actuator 10, and in this example, is integral with the first 12 and fourth 38 casing parts.

The quick release valve assembly 72 is illustrated schematically in FIG. 7, and includes a valve body 72a, an inlet port 72b which is connected to the source of pressurised fluid, an output port 72c and an exhaust port 72d. The output port 72c is connected to the first compartment 30a of the second chamber 30. The exhaust port 72d is connected to the second compartment 30b of the second chamber 30 by means of a second exhaust conduit 74.

Figure 7A:
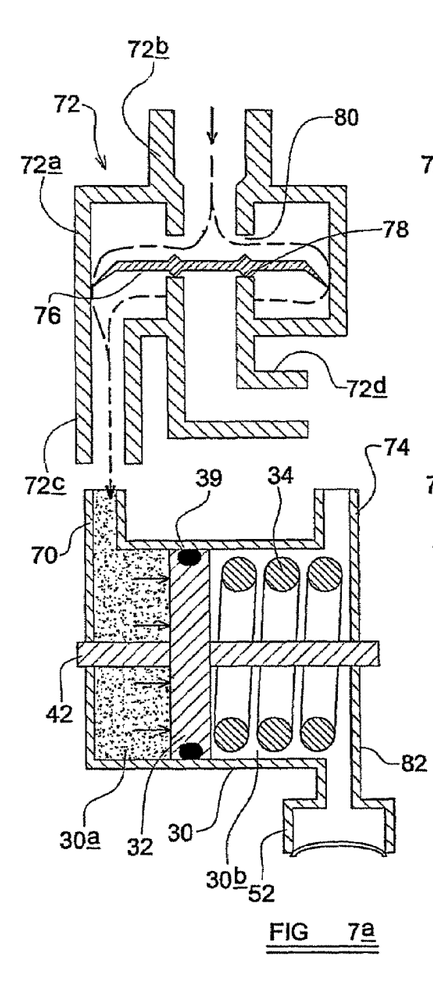
FIG. 7 is a schematic illustration of the quick release valve of the brake actuator of FIG. 1.
Figure 7B:
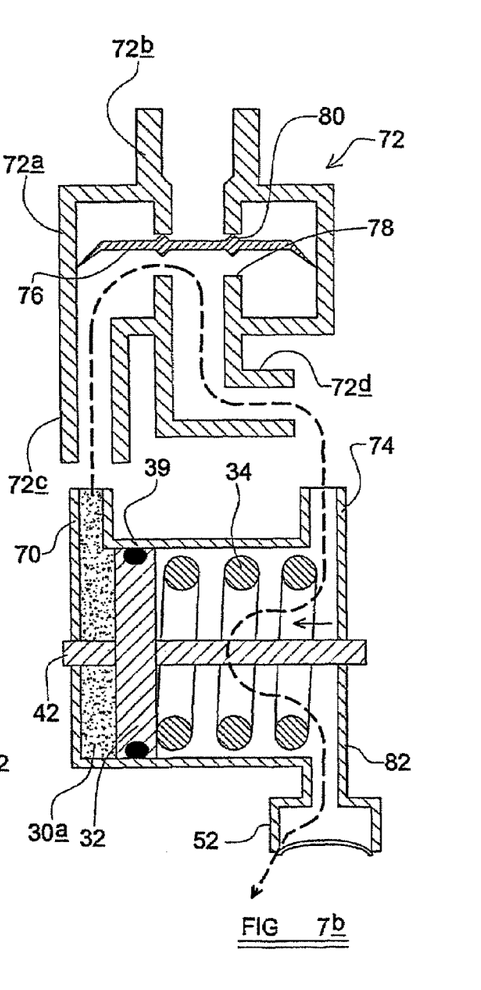

The quick release valve body 72a contains a pressure responsive element 76 comprising a rigid disc with a flexible skirt, the disc 76 being free to move within the valve body 72a between a first position (as illustrated in FIG. 7a) in which the disc 76 engages with a first valve seat 78 substantially to block the exhaust port 72d, and a second position in which the disc engages with a second valve seat 80 substantially to block the inlet port 72b (as illustrated in FIG. 7b).

In order to release the parking brake, pressurised fluid is supplied to the inlet port 72b of the quick release valve 72, and this forces the pressure responsive disc 76 into its first position. The pressure responsive disc 76 is configured such that when the fluid pressure at the inlet port 72b exceeds the pressure at the outlet port 72d by a pre-determined amount the flexible skirt may deform to allow fluid to pass around the pressure responsive element 76 from the input port 72b to the output port 72d. Pressurised fluid thus enters the first compartment 30a of the second chamber 30 and when the fluid pressure within the first compartment 30a is sufficient to overcome the biasing force of the spring 34, the piston 32 moves to the left as shown in FIGS. 1 and 5, bringing the second actuating rod 42 out of engagement with the diaphragm 14. The diaphragm 14 may thus move under the biasing force of the first spring 16 to its inoperative position, and hence release the vehicle brake.

In order to apply the parking brake, the supply of pressurised fluid to the inlet port 72b of the quick release valve 72 is stopped, and pressure from the fluid within the first compartment 30a of the second chamber 30 causes the pressure responsive disc 76 to move to its second position. The pressure responsive disc 76 is configured such that deformation of the skirt to allow flow of fluid from the outlet port 72c to the inlet port 72b is not permitted. Instead, the fluid flows out from the first compartment 30a of the second chamber 30 to the outlet port 72c and out through the exhaust port 72d.

The release of pressure from the first compartment of the second chamber 30 allows the piston 32 to move under the biasing force of the second spring 34 so that the second actuating rod 42 engages with the diaphragm 14, moves the diaphragm 14 to its operative position, and thus activates the vehicle brake.

In a conventional brake actuator, the exhaust port 72d of the quick release valve and the second compartment 30b of the second chamber 30 would vent to the atmosphere, and movement of the piston 32 under the biasing force of the spring 34 would cause air from the atmosphere around the brake actuator to be drawn into the second compartment 30b as its volume increases. Such air is often damp, however, and may include corrosive agents such as salt. As a result of its exposure to such an atmosphere, the spring 34 can become corroded and ultimately fail. Moreover, the interior surfaces of the second compartment 30b, may become corroded, and roughened, which may increase wear as the piston 32 moves in the second chamber 30.

In this brake actuator, however, the exhaust port 72d of the quick release valve is connected to the second compartment 30b of the second chamber 30, and thus exhaust air from the quick release valve 72 is drawn into the second compartment as its volume increases. Thus, the spring 34 is exposed primarily to clean, dry air from the quick release valve, and not to damp, salty air from the atmosphere around the brake actuator 10, and corrosion 16 of the interior surfaces of the second compartment 30b and the spring 34 may be correspondingly reduced.

It will also be appreciated that, as the parking brake is released, not only is the piston 32 moving to decrease the volume of the second compartment 30b of the second chamber 30, but the diaphragm 14 is also moving to increase the volume of the second compartment 12b of the first chamber 12.

In this example, the second compartment 30b of the second chamber 30 is connected to actuator exhaust 52 by means of a further conduit 82. Thus, as the parking brake is released, fluid expelled from the second compartment 30b of the second chamber 30 may be drawn into the second compartment 12b of the first chamber 12, in addition to fluid from the ABS valve assembly 44.

Various modifications may be made to the brake actuator without departing from the scope of the present invention.

It will be appreciated that, whilst in the above example, the brake actuator is configured such that clean, dry fluid from the ABS valve assembly 44 and the quick release valve 72 is directed over the springs 16, 34, the brake actuator 10 may be configured so that either fluid from the ABS valve assembly 44 is directed over the first resilient biasing element 16, or fluid from the quick release valve 72 is directed over the second resilient biasing element 34.

It should also be appreciated whilst in the example given, fluid expelled from one side of a pressure responsive element is directed to the other side of that element, this need not be the case. For example, the exhaust port 72d of the quick release valve assembly 72 may be connected to the second compartment 12b of the first chamber 12 instead of the second compartment 30b of the second chamber 30. Alternatively, or additionally, the exhaust conduit 50 of the ABS valve assembly 44 may be connected to the second compartment 30b of the second chamber 30 rather than to the second compartment 12b of the first chamber 12.

Moreover, the invention is not restricted for use in relation to the configuration of quick release valve or ABS valve assembly described above. For example, the ABS valve assembly may be as described in International patent application no. WO98/41429.

The invention could also be applied to the brake actuators described in UK patent application Nos. GB2395752 or GB0305125.7, by connecting the chambers containing the two springs to the exhaust ports of the quick release valve and ABS valve assembly, and to a common actuator exhaust port, instead of venting the two chambers to the atmosphere.

The ABS valve assembly 44 may be replaced by an EBS valve assembly.

In the embodiment of the invention described above, there is provided a single actuator exhaust 52 to which exhaust fluid from both the quick release valve assembly 72 and the ABS valve assembly 44 passes. Two separate exhausts may instead be provided—one for the quick release valve assembly 72 and the other for the ABS valve assembly 44.

Whilst in the embodiment described above there is provided spring 16 in the second compartment 12b of the first chamber 12, which assists in returning the actuating rod 28 to its inoperative position once the braking force is released, it is not necessary to provide such a spring 16. Where no such spring 16 or other resilient biasing element is provided, a return spring provided in the brake itself must be capable of exerting sufficient biasing force to return the actuating rod 28 to its inoperative position without any further assistance.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A brake actuator including a chamber in which is provided a first movable pressure responsive element which divides the chamber into first and second compartments, the second compartment having mounted therein a resilient biasing element which may act on the first pressure responsive element to move the first pressure responsive element to reduce the volume of one compartment and increase the volume of the other compartment, and a first valve assembly with an inlet which is connected to a source of pressurised fluid, and outlet which is connected to the first compartment, and an exhaust port through which fluid from the first compartment may be released, the brake actuator also including a second chamber in which is provided a second movable pressure responsive element which divides the second chamber into first and second compartments, the first compartment being connected to a source of pressurised fluid via a second valve assembly and the second compartment having mounted therein a second resilient biasing element which may act on the second pressure responsive element to move the pressure responsive element to reduce the volume of one compartment and increase the volume of the other compartment, the second valve assembly including and exhaust port through which pressurised fluid from the first compartment may be released, both resilient biasing elements being movable between a baking position and an inoperative position, and one resilient biasing element urging its responsive element towards the operative position, and the other resilient biasing element urging its respective pressure responsive element towards the braking position, wherein the exhaust port of the first valve assembly is connected to the second compartment of the first chamber, the exhaust port of the second valve assembly is connected to the second compartment of the second chamber, and second compartment of the second chamber is connected to the exhaust port of the first valve assemble.

2. A brake actuator according to claim 1 wherein the second compartment of the second chamber is in fluid communication with the second compartment of the first chamber.

3. A brake actuator according to claim 2 wherein the first and second chambers are contained within a housing, the first valve assembly is located between the first chamber and the second chamber, and the second valve assembly is mounted on an exterior surface of the housing.

4. A brake actuator according to claim 3 wherein the first and second valve assemblies are integral with the housing.

5. A brake actuator according to claim 1 further including an actuator exhaust port which is connected between the exhaust port of the first valve assembly and the second compartment of the first chamber, so that the second compartment and the exhaust port of the first valve assembly are always in fluid communication with the atmosphere.

6. A brake actuator according to claim 1 wherein one of the first or second valve assemblies is located between the first chamber and the second chamber.

7. A brake actuator according to claim 1 wherein the first and second chambers are contained within a housing and one or both of the first or second valve assemblies are integral with the housing.

8. A brake actuator according to claim 1 wherein the exhaust port of the second valve assembly is connected to the second compartment of the second chamber and to the actuator exhaust port.

9. A brake actuator including a chamber in which is provided a movable pressure responsive element which divides the chamber into first and second compartments, the brake actuator also including a valve assembly with an inlet which is connected to a source of pressurised fluid, an outlet which is connected to a volume within the brake actuator not including the second compartment, and an exhaust port through which fluid from the volume may be released, wherein the exhaust port of the valve assembly is connected to the second compartment; and an actuator exhaust port which is connected between the exhaust port of the valve assembly and the second compartment, so that the second compartment and the exhaust port of the valve assembly are always in fluid communication with the atmosphere.

10. A brake actuator for activating brakes without venting to an atmosphere, comprising:
   a chamber having a movable responsive element for dividing said chamber into first and second compartments;
   a valve assembly having an air inlet connected to said first compartment and said first compartment is connected to said second compartment, where said second compartment is downstream from said first compartment, wherein the connection between said first compartment and said second compartment define an exhaust from said first compartment;
   a diaphragm placed between said first and second compartments;
   said diaphragm translates to a first position to inhibit air flow between said first and second compartments when the brakes are activated, wherein air flow is permitted from said air inlet to said first compartment;
   said diaphragm translates to a second position away from said first position to permit air flow from said first compartment to and second compartment when the brakes are released, wherein air flow is exhausted from said first compartment to said second compartment;
   wherein said first and second compartments are without a vent to the atmosphere.

11. The brake actuator according to claim 10, wherein said valve assembly is a closed system without a vent to the atmosphere.

* * * * *